(12) United States Patent
Khadzhiev et al.

(10) Patent No.: US 7,585,406 B2
(45) Date of Patent: Sep. 8, 2009

(54) PROCESS FOR HYDROCONVERTING OF A HEAVY HYDROCARBONACEOUS FEEDSTOCK

(75) Inventors: Salambek Naibovich Khadzhiev, Moscow (RU); Khusain Magamedovich Kadiev, Grozny (RU); Vahid Khumaidovich Mezhidov, Moscow (RU); Jamshid Zarkesh, Tehran (IR); Reza Hashemi, Tehran (IR); Seyed Kamal Masoudian Targhi, Tehran (IR)

(73) Assignees: Research Institute of Petroleum Industry (RIPI), Tehran (IR); NTI Company, Moscow (RU)

( * ) Notice: Subject to any disclaimer, the term of this patent is extended or adjusted under 35 U.S.C. 154(b) by 438 days.

(21) Appl. No.: 11/505,769

(22) Filed: Aug. 16, 2006

(65) Prior Publication Data

US 2007/0045156 A1   Mar. 1, 2007

(30) Foreign Application Priority Data

Aug. 16, 2005   (EP) .................................. 05107538

(51) Int. Cl.
*C10G 47/02* (2006.01)
*C10G 47/00* (2006.01)
*C10G 45/00* (2006.01)

(52) U.S. Cl. ...................... 208/112; 208/107; 208/143; 502/173; 502/220; 502/321

(58) Field of Classification Search ................. 208/107, 208/108, 111.3, 112, 143, 144, 145, 192; 585/6.6, 13, 257, 25
See application file for complete search history.

(56) References Cited

U.S. PATENT DOCUMENTS

| 4,172,814 | A | 10/1979 | Moll et al. |
| 4,376,037 | A | 3/1983 | Dahlberg et al. |
| 4,431,520 | A | 2/1984 | Giuliani et al. |
| 4,637,870 | A | 1/1987 | Bearden, Jr. et al. |
| 4,659,454 | A | 4/1987 | Varghese et al. |
| 5,039,392 | A | 8/1991 | Bearden, Jr. et al. |
| 5,948,721 | A | 9/1999 | Yuansheng et al. |
| 6,004,454 | A | 12/1999 | Yuansheng et al. |

FOREIGN PATENT DOCUMENTS

| FR | 2631631 | 11/1989 |
| RU | 2146274 | 10/2000 |
| WO | WO93/03117 | 2/1993 |

*Primary Examiner*—Walter D Griffin
*Assistant Examiner*—Jerrod B Marten
(74) *Attorney, Agent, or Firm*—Kenyon & Kenyon LLP

(57) ABSTRACT

A Process for hydroconverting of a heavy hydrocarbonaceous feedstock comprising a catalyst to produce lower boiling hydrocarbon products. The method can be used for the high-boiling point residues of oil refining (asphaltene, the residues of vacuum and under pressure distillation of oil, and the useless and heavy materials of thermo catalytic processes), heavy oil, natural bitumen, and bitumen-containing sands. It can also be used in oil refinery industries for the production of gas, gasoline fractions, distillation gas oil, concentrate of ash containing metals and chemical fertilizers.

27 Claims, 2 Drawing Sheets

PROCESS FOR HYDROCONVERTING OF A HEAVY HYDROCARBONACEOUS FEEDSTOCK

CROSS-REFERENCE TO RELATED APPLICATION

The present application claims priority to European Application No. 05107538.0 filed in the European Patent Office on August 6, 2005 of which is expressly incorporated herein in its entirety by reference thereto.

FIELD OF THE INVENTION

The present invention relates to a novel process for hydroconverting of a heavy hydrocarbonaceous feedstock comprising a catalyst to produce lower boiling hydrocarbon products. In particular, said process can be used for the high boiling point residues of oil refining (asphaltene, the residues of vacuum and distillation under pressure of oil, and the useless and heavy materials of thermo catalytic processes), heavy oil, natural bitumen, and bitumen-containing sands. It can also be used in oil refinery industries for the production of gas, gasoline fractions, distillation gas oil, concentrates of ash containing metals and chemical fertilizers.

BACKGROUND OF THE INVENTION

There is substantial interest in the petroleum industry for converting heavy hydrocarbonaceous feedstocks to lower boiling liquids. The hydrogenation of heavy oil is used for increasing the up-grading of heavy hydrocarbons. According to such a process, heavy hydrocarbons are converted to lighter products and mid-distillate liquids of lower boiling points. Heterogeneous catalysts, such as sulfides of Co, Mo or Ni on an aluminium oxide support, are utilized.

High molecular weight components of the crude oil, adsorbed by the catalyst surface, plug the pores and active sites of the catalyst, and therefore gravely reduce the activity of an hydrogenation reaction. The asphaltene and organometallic compounds of the crude oil are separated, deposited on the catalyst surface and deactivate the catalyst. The heavier the hydrocarbon is, the shorter the catalyst lifetime becomes. One requirement of such processes is to always hold a high partial pressure of hydrogen.

U.S. Pat. No. 4,637,870 describes a hydrogenation refinery method, in which a phosphorus and molybdenum containing catalyst is added to an aqueous solution. During this process, phosphoric acid changes to phospho-molybdic acid. This solution is mixed with hydrocarbons to get the primary solution of the catalyst. The resulting primary solution is dehydrated and sulfidized, added to feedstock (heavy oil or heavy residue), and then introduced into the reactor for the hydrogenation reaction to start. During the mentioned process, commercial phospho-molybdic acid of a P/Mo atomic ratio of 0.08 up to 1/0.1 up to 1 is used. Phospho-molybdic acid, for reducing the resulting coke, is added, said ratio in the solution should be 0.12 up to 1/0.45 up to 1.

The drawback of this method is the high amount of produced coke, difficulties with preparing the catalyst and adding the catalyst to the feedstock before entering the reactor. Still further, the used catalyst is very expensive and that makes the method uneconomical.

U.S. Pat. No. 4,659,454 refers to a hydrocracking method for heavy oil in which over 75% of the fractions the boiling points of which are over 400° C. are mixed with 5-50% of distillation fractions with boiling points of 150-400° C. Compounds of IV, V, VI, VII, and VIII transition metal elements that are present in this mixture will decompose as a result of being heated. The acidic zeolite catalyst solid is added to the feed in an amount equal to 0.1 to 10 weight percent of the feed. Said process was performed at 250-500° C., under a pressure of 25-50 MPa in mixing or plug flow reactor with a liquid hourly space velocity of $0.1$-$10 \, h^{-1}$.

Application of high pressures in said method (more than 25 MPa) and the consequent need to special equipments, the relatively low production of light hydrocarbon fractions and also the lack of a good solution for catalyst regeneration and separation of metals present in feedstock are the drawbacks of this method.

Another method is disclosed in the FR 2,631,631, in which the hydrogenation process is performed at 430° C. by using the sulfides of transition metals, suspending the feedstock.

The catalyst of said method is prepared as follows.

Metallic compounds of VIIB, VIIB, and VIII elements, such as Mo, phosphomolybdic acid and a salt of phosphomolybdic acid are mixed with the asphaltene and organic polysulfides containing feedstocks.

The resulting mixture is heated in the presence of hydrogen gas and under a pressure of 0.5-20 MPa and temperature of 260-450° C.

The resulting concentrated catalyst is added to the feedstock.

The difficulties with preparing the catalyst, the necessity of application of polysulfides, which makes the technology both difficult and expensive, and the lack of a suitable solution for catalyst regeneration are the problems of the said method.

U.S. Pat. No. 5,039,392 altered the above described method by using sulfur as the sulfidizing element in the preparation of the primary concentrated catalyst solution.

That method includes:

The dispersion of the aqueous catalyst solution in the hydrocarbon solution, dehydrating, sulfidizing, the addition of the resulting mixture to feedstock and introducing the second resulting mixture into the reactor for the reaction to start.

The amount of catalyst in said method is about 50-300 ppm, the produced coke (solid product) is about 2% and at least 1.8% by mass.

The high amount of produced coke, difficulties with catalyst preparation due to the dehydrating and vulcanizing steps are problems of said method.

WO 93/03117 describes the hydrogenation conversion of heavy hydrocarbons to lower boiling point products at 343-515° C., using hydrogen (50-5000 psig) and adding concentrated catalyst, wherein said concentrated catalyst is prepared as follows:

The primary catalyst solution is prepared by mixing hydrocarbon fractions of boiling points of higher than 570° C. with aqueous solutions of metal compounds of II, III, IV, V, VIIB, VIIB and VIII metals of the Periodic Table, in a way that the amount of metal in the said feedstock is from 0.2 to 2 percents by mass.

By heating the primary catalyst prepared according to the first step (without adding hydrogen) is sulfudized at 275-425° C. with elemental sulfur as the sulfiding agent.

Preparation of concentrated catalyst under special conditions and according to an unnecessarily sophisticated step, application of expensive phosphomolybdic acid and lack of a solution for the problem of catalyst regeneration are disadvantages of this method.

U.S. Pat. No. 6,004,454 presents another method for hydrocracking of heavy oil and residuum, namely by using a dispersing-type catalyst that is dispersed in the feedstock.

Said catalyst contains (2-15) mass percents of Mo, (0.1-2) mass percent of Ni and (0.1-3) mass percents of phosphorous. The oxides or salts of Mo and Ni are dissolved in water to prepare the catalyst.

Unprocessed oil and primary raw material (heavy residue) are mixed with said catalyst, the mixture is heated and it enters the reactor. The hydrocracking reaction is performed in 380-460° C. and under a pressure of 10-15 MPa.

Said catalyst is added in an amount that the concentration of said active metals reach 150-1500 ppm. The outlet of distillation fractions in this process is about 70% by mass, and is mostly coke free.

The low amount of distillation fractions outlets, high cost of the method due to the high flow of the process and lacking a suitable method for catalyst separation are disadvantages of this method.

RU 2,146,274 refers to a method for the conversion of raw heavy hydrocarbons.

According to this method the catalyst is evenly distributed through the feedstock. The catalyst is directly made in the reaction zone from the emulsion formed by mixing the feedstock with the aqueous solution containing molybdate. Emulsion of the catalyst (aqueous solution) in oil is prepared in advance. Gas containing hydrogen is fed to contact the prepared emulsion which results in hydrogenation of the mixture. Light fraction containing 70% distillate reacts at a boiling temperature of up to 500° C. and is refined by hydrogenation. Reaction products are divided into distillate fractions with boiling temperature of up to 350° C. and residuals with more than 350° C. In this case, all of the residuals with boiling temperature of more than 350° C. are burned for catalyst regeneration and separation of metals existing in the feedstock.

The drawback of this method is the low amount of light hydrogenation products. Environmental and economic indexes of this method are low because a considerable amount (1-40)% of the hydrogenation residue, which contain valuable fractions, are lost when heated more. Another disadvantage of this method is that the residues with boiling points of more than 350° C. return to said hydroconversion process, while it contains viscose materials like coke, asphaltenes and the spent catalyst, reducing the yield of the process.

SUMMARY OF INVENTION

It is the object of the present invention to overcome or at least reduce the above mentioned drawbacks and to provide a process for hydroconverting a hydrocarbonaceous feedstock for producing lower boiling hydrocarbon products working in an efficient manner and taking into consideration the recycling of the catalyst.

The object is solved by a novel process for hydroconverting a heavy hydrocarbonaceous feedstock comprising a catalyst to produce lower boiling hydrocarbon products, which process comprises the following steps:
  (a)—Activation of the feedstock by adding modifiers and stabilizers,
  (b)—Preparation of a catalyst complex comprising an emulsion of pre-activated heavy hydrocarbons, water and catalytic compounds,
  (c)—Hydrogenation of the remaining activated heavy hydrocarbons in the presence of hydrogen gas and the emulsion of catalytic complex of step (b),
  (d) Fractionation of the products of step (c) as liquid-gas streams by means of atmospheric and/or vacuum distillation,
  (e) Returning the residues of the distillation process to the process of step (a) after separating the solid particle content,
  (f) Separation of catalyst elements from the solid particles, wherein said catalyst elements are recycled to a preliminary catalyst complex preparation unit.

The present invention puts forward a hydrogenation upgrading method for hydrocarbons of high APIs wherein:
  The conversion of said process is high (over 95%).
  No coke is formed due to the type of the catalyst and also due to the presence of hydrogen.
  There is no so called "touchiness" to the feed and its metal and solid materials content.
  Due to what is just said above, said feed does not require any pre-treatment operations.
  The yield of disulfurization exceeds 60%.
  Heavy metals are completely removed from feedstock
  It has a relatively lower cost construction, in comparison to the other previously reported inventions.
  It is truly economical due to its high rate of return.

The foregoing, as well as additional objects, features and advantages of the invention will be more readily apparent from the following detailed description, which proceeds with reference to the accompanying drawings.

DETAILED DESCRIPTION OF THE INVENTION

Figure 1:
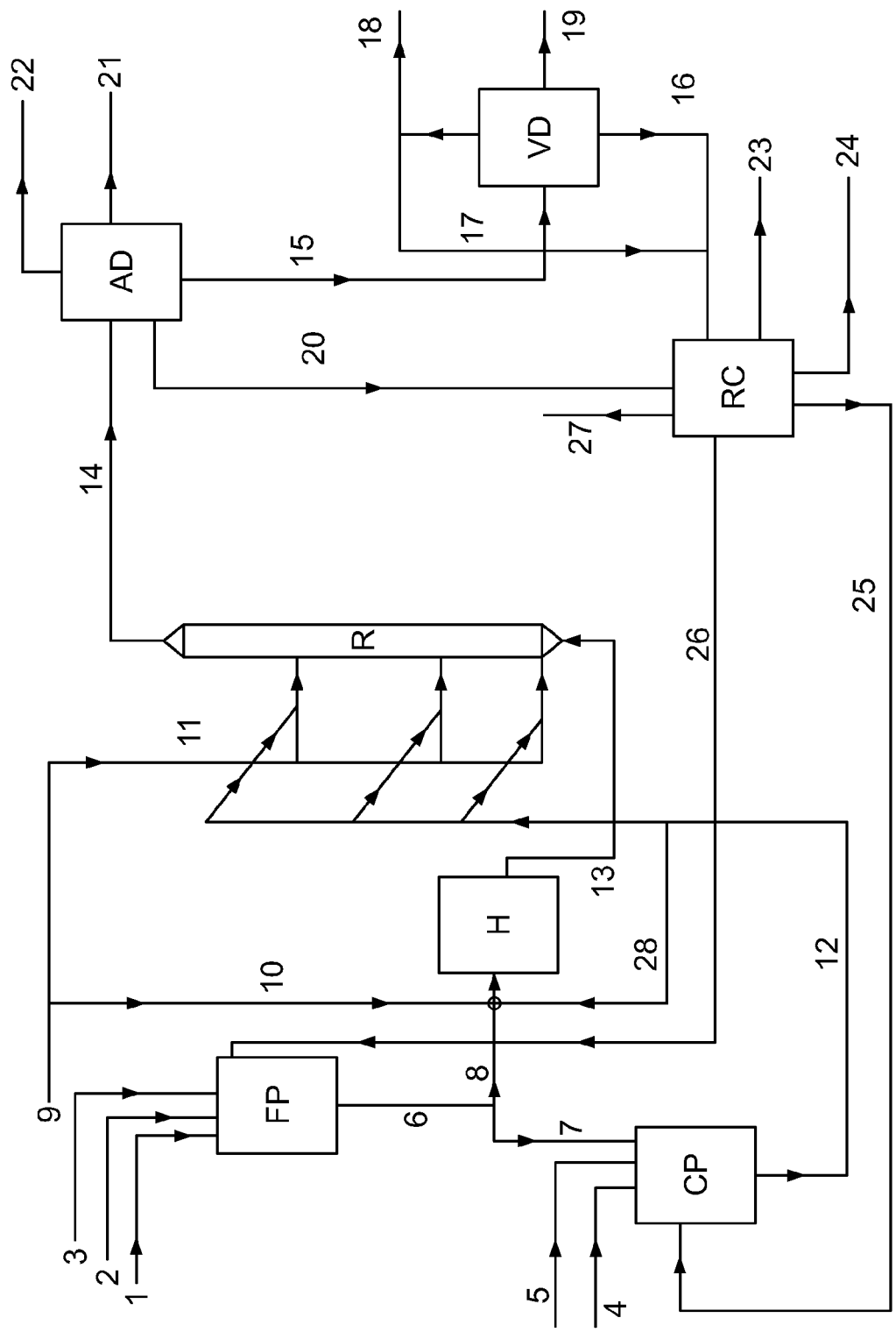
FIG. 1 illustrates the overall diagram of a preferred embodiment of the process according to the present invention.

The present invention provides a hydrogenation upgrading process for crude hydrocarbons of high molecular weights and other materials that contain the hydrocarbons present in oil residues in the presence of emulsion catalyst complexe comprising a mixture of an aqueous solution of ammonium paramolybdate.

The environment safety indexes are optimized by increasing the amount of outlet mid-distillate fractions by means of increasing the efficiency of the used catalysts, optimization of the product by disulfurization and reducing the amount of unconverted compounds in end products, which if present, will cause coke formation in the end products.

The following leads to the optimization of process parameters in said invention:
  Activation of the feedstock by dispersion and application of species which increase the lyophilic of the heavy hydrocarbon. Maintaining the dispersion of the activated heavy hydrocarbon at a high level increases the process efficiency.
  The catalyst complex is made by preparing an emulsion of an aqueous solution of a catalyst compound in the activated heavy hydrocarbon.
  Step-wise addition of the catalyst emulsion to the reaction zone will lead to a higher catalyst activation and as a result the process will need less catalyst in order to give a certain level of conversion.
  Regeneration of the catalyst by combustion of solid residue of filtration of fractions with boiling points of $\geqq 520°$ C. The solid residues remained from filtering the residue of vacuum distillation and the residues of filtration of said mid-emulsion materials are combusted. The resulting ash is collected and the catalyst elements are extracted from said ash, washed with a common ammonia-carbonate method, and returned to the process in the form of ammonium paramolybdate.

Collecting the concentrated ash containing metals present in said feedstocks (Ni, V, etc.).

Increasing the environmental safety of the process through refining gases produced during the regeneration of the catalyst by converting SOx gases to ammonium sulfate chemical fertilizer, and reducing nitrogen oxide emissions by adding ozone to outlet gases in a way that sulfur and nitrogen oxides can be removed upto 98% and 60% respectively.

In a preferred embodiment of the invention, the method can solve the problem of heavy hydrocarbon upgrading as follows:

The heavy hydrocarbon is dispersed by the application of strong modifiers. Here, oil fractions containing at least 60% of thermal stable cyclic hydrocarbons are used as modifiers. Preferably, catalytic cracking gas oils, pyrolysis resins or aromatic compounds that have been extracted during oil purification, as modifiers are used. The modifiers can be used in amounts leading to the maximum efficiency in decreasing the viscosity of the heavy hydrocarbons. Preferably, the amount is 0.5 to 3.5% of the mass of the said feedstock.

To stabilize the highly dispersed heavy hydrocarbon materials of high surface tension, preferably compounds containing polar bonds such as acetone, diethyl keton and nitrobenzene are used as stabilizers. Preferably, the amount of the stabilizer, is between 0.001 to 0.01% of mass of the feed. Moreover, preferably the amount of the stabilizer should lead to a coagulation ratio of about 1.9.

In the present invention an amount of 5-10% by mass of the activated heavy hydrocarbon is mixed with an aqueous solution of ammonium paramolybdate in a way that the mass of said heavy hydrocarbon to mass of water to paramolybdate equals 1 over 0.005-0.05 over ($5 \times 10^{-5}$-$8 \times 10^{-3}$), and the resulting mixture is homogenized in a homogenization temperature of 60-98° C., so that a stable emulsion of said catalyst complex with drop diameters of 100-7000 nm, and more preferably of 200-600 nm is yielded where the number of particles per 1 cm$^3$ equals $1 \times 10^{14}$ to $1 \times 10^{16}$.

The hydrogenation process according to the present invention hydrogenates the majority of activated heavy hydrocarbon to a value of up to 90% by mass. During the process, a catalyst emulsion and an H$_2$ containing gas are used. The first fraction of the catalyst emulsion and the H$_2$— containing gas are sprayed to the activated heavy hydrocarbon entering a heater of about 300-400° C., so as to yield a mixture of a molybdenum compound concentration of 0.001-0.01% by mass. The next fractions of the catalyst complex emulsions and the H$_2$—containing gas are directly sprayed in 2 to 4, and more preferable in 3 fractions, to the reactor of 400-500° C. temperature.

The amount of the emulsion should be so that the Mo compound concentration equals 0.005-0.05% by mass in the reaction zone.

The hydrogenation process is performed at a temperature of about 430-470° C., under a pressure of about 1-15 MPa, with a feedstock hourly space velocity of about 0.5-5 h$^{-1}$, with a H$_2$ gas to feedstock volume ratio of about 500 to 1500 liters/lit of feed in a vessel.

During the process according to the present invention the product of the hydrogenation step is divided into liquid and gaseous streams in the atmospheric-vacuum distillation unit, and at least about 90% of the distillate fractions with boiling points of less than 520° C. are yielded. The residues with boiling points of over 520° C. are filtered partially or completely. To modify the conditions for the separation of concentrated metals from the residues of vacuum distillation substances, about (3-10) percent by mass of the gas oil at the top of the vacuum distillation tower is added to residues of vacuum distillation. The filtrate which contains about 0.2% by mass of solid particles, is mixed with the feed again. The catalyst regeneration process is performed on at least 99% by mass of the vacuum distillation substances. Preferably, the remaining solid material is combusted with the solid material remaining from the filtration of the mid emulsion layer, and the ammonia-carbonate washing method is used to extract the catalyst as ammonium paramolybdate and added to the feed of the catalyst complex preparation unit. The concentrated ash of the present metals in the feed is used for extracting metals. The gases resulted by the regeneration process are processed by ozone, so that the amount of NOx compounds being discharged to the air is reduced. Preferably, the gases are also treated with ammonia, and SOx compounds are consequently converted to ammonium sulfate.

Further, the feedstock of the process according to the present invention can be a raw hydrocarbon material with a high molecular weight, a heavy residue of oil distillation in vacuum and atmospheric pressure towers, and preferably contains high amounts of sulfur compounds and high concentrations of heavy metals.

Preferably, the catalyst complex used in the process according to the present invention comprises water soluble compounds of transition metals, which can change to catalytic compounds, preferably to MOS$_2$, under the operational conditions of the invention, and have hydrogenation and hydrating abilities.

According to the present invention, the catalyst complex emulsion can be sprayed to the reactor sequentially and in some fragments, so that the total amount of Mo in the reaction zone reaches 0.005-0.05% by mass of the feed.

Further, the MOS$_2$ catalyst is preferably formed in the reactor from the emulsion. Most preferably, the emulsion is prepared from a mixture of the activated feedstock and an aqueous solution of Mo compound.

Distillation fractions with a boiling point of about 350° C., vacuum gas oil with a boiling point of about 350 to 520° C. and the remaining material with a boiling point of higher than about 520° C. are, for example, products of the process according to the present invention.

Preferably, the residues of filtration having boiling points of higher than about 520° C. are mixed with the solid material that is separated from the mid-emulsion layer, and the resulting combustible mixture is combusted in excess air 5-25% so that its organic content is combusted.

According to the present invention, the catalyst compounds (molybdenum oxide and to some extent nickel oxides) can be separated from the ash by a common ammonia carbonate washing. Preferably, the ash is placed in the reactor and 7-11% by mass of an aqueous ammonia solution and 3-6% by mass of an aqueous ammonium carbonated solution with mass ratio of ash to the solution 1 to (2-5) is mixed with said ash at a temperature of 80° C. The resulting suspension can be filtered and the liquid phase can be returned to the reactor so that a 10% by mass solution of ammonium paramolybdate is achieved. When the desired concentration is achieved, the solution can be sent to the catalyst complex preparation unit.

Preferably, the exiting gases, the metal oxide content of which is removed, are mixed with O$_3$ so that their NO$_x$ is converted to molecular N$_2$ is achieved. In a next step, the gases can be treated with an ammonia solution of 25% concentration, so that their $SO_x$ content is converted to ammonium sulfate.

The foregoing, as well as additional objects, features and advantages of the invention will be more readily apparent from the following detailed description of the figures.

FIG. 1 illustrates the overall diagram of a preferred embodiment of the process according to the present invention for the hydroconversion of high molecular weight hydrocarbons, in which (FP) is the said feedstock preparation unit, (CP) is the said catalyst complex preparation unit, (H) it shows said heater of feedstock and hydrogen, (R) is said hydrogenation reactor, (AD) is said gas separation and atmospheric distillation of products unit, (VD) is said vacuum distillation tower for distillation of residues of boiling points of higher than 350° C. and (RC) is said catalyst regeneration unit for combusting a part of residues of said hydrogenation process together with the purification of exiting gases.

High molecular weight hydrocarbons (pipeline 1) are homogenized in a homogenizer-mixer FP unit, with a back stream of said filtrate of hydrogenation residue having boiling points of higher than 520° C. (pipeline 26), said modifier (pipeline 2), and stabilizer (pipeline 3) after mixing and performing chemo-physical treatments, so that an activated mixture of a viscosity ½-⅓ times that of said heavy hydrocarbon is gained.

In the process, the heavy hydrocarbon can be the high boiling point residue of oil refinery, high API oil, normal or high sulfur oils, natural bitumen, bitumen containing sands, etc. Said modifiers used in present invention, are oil fractions containing at least 60% of heat stable cyclic hydrocarbons. High surface tension materials, mostly those containing polar bonds, like acetone, diethyl ketone, and nitrobenzene are used as stabilizers.

In the catalyst complex preparation unit, in the mixer—emulsifier (CP) and in 75-95° C., a fresh make up ammonium paramolybdate solution (Via pipeline 4) is mixed with said refined solution (pipeline 25) which contains said catalyst in the form of ammonium paramolybdate, and said activated heavy hydrocarbon (pipeline 7) in order to compensate for the spent molybdenum. The suspension of said solution is continued until a stable emulsion of 100-7000 nm and preferably 200-600 nm drop diameters is achieved. The amount of said activated heavy hydrocarbon is 5-10% by mass at this stage.

The remaining activated mixture of the heavy hydrocarbon (pipeline 8) is transferred to said heater (H) and to the hydrogenation reactor (R). Hydrogen gas is injected simultaneously to the heater (pipeline 10) and the reactor (pipeline 11) by injection mixers. In the injection mixers, hydrogen gas is absorbed by the catalyst complex. Hydrogen, together with said catalyst complex, is sprayed to the feed flow at the heater's intake, and to the up going flow along the height of reactor, at 2-4 points depending on the conditions. Said reaction mixture is hydrogenised under a hydrogen pressure of 3-8 MPa and in a temperature of 420-500° C.

Figure 2:
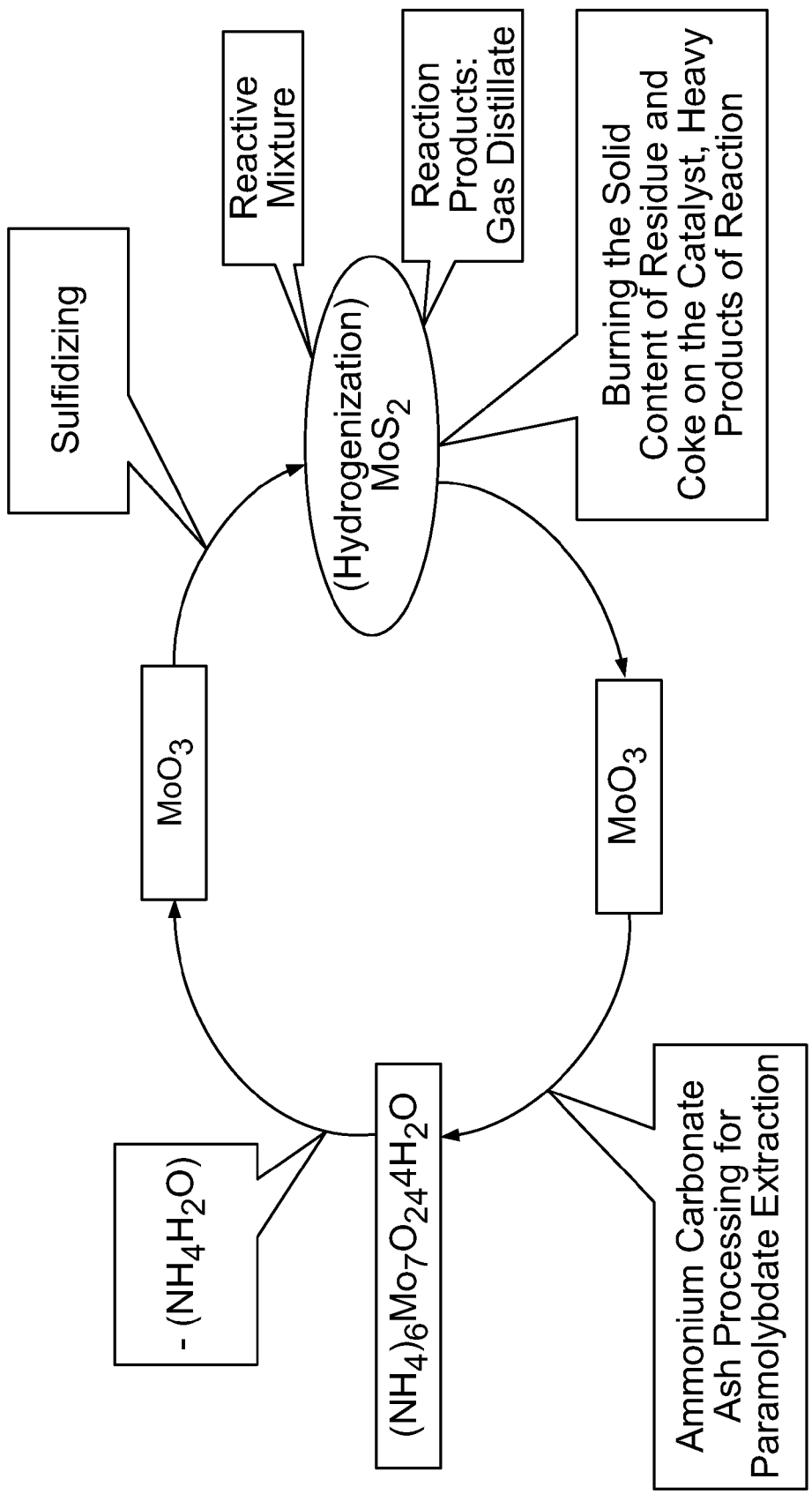
FIG. 2 shows a schematic diagram of a preferred embodiment of the catalytic conversion cycle.

FIG. 2 shows the catalytic conversion cycle structurewise. When said catalyst complex emulsion is sprayed to high temperature region, minute explosions occur, leading to the evaporation of aqueous phase and a more dispersion of the solution, and as a result, water and ammonium are separated from ammonium paramolybdate and some molybdenum oxide ($MoO_3$) is produced. As a result of the thermal decomposition of emulsion particles, not only the dispersed phase components around the particles, but also the particles themselves are broken down, and oxide particles with sizes much smaller than said emulsion particles are formed. While the process continues, said molybdenum oxides are sulfidized and as a result a highly dispersed suspension of very small particles (in the nanometer range) of molybdenum disulfide with sizes of 2-9 nm, and more probably, of 3-5 nm are formed and evenly distributed in the hydrocarbon medium.

Sulfidization of molybdenum oxide and nickel compounds, is due to sulfur bearing compound existing in the feed and/or hydrogen sulfide in the composition of the gas used for hydrogenization. Sulfidizing the components of fresh catalyst leads to an increase in desulphurization level of the reaction products since in addition to hydrogenolysis of sulfur bearing compounds, at the catalyst regeneration stage sulfur is removed from the system in the form of sulfur oxides in smoke gases.

Ammonium paramolybdate particles, which are dispersed in the heavy hydrocarbon, are surrounded by the small (in nano range) particles in the said oil medium. Furthermore, asphalten particles that are in the form of nanoparticles surround these particles as closely as possible and by playing the role of a natural stabilizer form a mycelium safety layer in which exists a core of ammonium molybdate. When said emulsion is located in a place, wherein said aqueous phase of said emulsion is instantly evaporated, said complex nanoparticles are broken again, forming new heteroatomic nanoparticles which enter the reaction with the remnants of said thermal decomposition of catalyst complex of molybdenum and other metal oxides.

The advantage of the catalyst is the high surface area, that can be accessed by organic molecules of any forms or dimensions.

The sulfur particles present in the heavy hydrocarbon lead to multiplication of said catalyst activity, in other words, the formation of metal sulfides increases the catalyst activity gravely.

Increases in the amount of sulfur in the reaction medium, modifies said hydrogenation process. Said reaction products enter an atmospheric distillation unit (AD) and divided into gas and liquid fractions. Fractions with boiling points of less than 350° C. are used as engine fuels. Said mid-emulsion (20) is accumulated in cold separator before being transferred to the catalyst regeneration unit. Distillation residues, fractions with boiling points of more than (350° C.) are sent to the vacuum distillation unit (VD).

In the vacuum distillation unit, the distillation fractions of boiling points over 350° C. are divided into distillation fractions of boiling points of less than 520° C. and an a residue of boiling points of more than 520° C., said residue containing less than 2% of pseudo coke solid materials, solid catalyst in the form of $MOS_2$ which is partially deactivated by adsorbed asphaltene-resin materials, and also sulfides of metals present in the feedstock. To reduce the costs of regeneration and separation of said catalyst, the residue with more than 520° C. boiling points is filtered and the filtrate (pipeline 26) containing at most 0.2% by mass, of solid particles is returned to FP unit, which is facilitated with mixers and homogenizers, where it is mixed with fresh feed, modifiers and stabilizers. The resulting solid residue of the fraction with more than 520° C. boiling points, is mixed with the solid residues achieved from the mid emulsion layer and combusted in said catalyst regeneration unit, yielding a mixture of the ash containing metal oxides and outlet gases. The heat achieved in this step, is used for generation of steam. Solid residue is combusted in the presence of additional air (under pressure) so that the combustion is complete.

After separating the solid products of combustion and gas, the mixture of ash is transferred to a reactor that is heated, where it is washed with an alkaline solution, and its Mo content is separated.

To do this an aqueous solution containing 7-11% by mass of ammonia and (3-6%) by mass of ammonium carbonate with a mass ratio of ash to said solution of 1 over (2-5) is sent to said reactor, before going to said filter. The precipitate separated by said filter is washed and the filtrate enters a cycle, and the cycle is continued until the Mo concentration in said solution reaches the desired value, and said solution is returned to catalyst emulsion preparation unit (mixer-emulsifier vessel).

During ashes leaching by ammonium carbonate solution, the oxides of nickel existing in the ashes, are partially, (up to 60%) transferred to the ammonium paramolybdate solution, which is returned back to the said catalyst preparation unit. Knowing that nickel is an active strong modifier of $MOS_2$ catalytic activity in hydrogenation reactions, its presence in the ammonium paramolybdate solution, increases the amount of light fractions, reduces the materials that plug catalyst pores, and increase the saturation of mid-distillate fractions by hydrogen. In the present invention nickel is used with a ratio of 0.1-1 atom per each Mo atom, and more preferably with a ratio of 0.5 nickel atom per each Mo atom.

After extracting Mo, and to some extent Ni, from ash residue, water insoluble materials, including ammonium vanadate and oxides of other metals present in heavy hydrocarbons, remains.

The Ash residue is dried, so that it can undergo an extraction process for its metals, later.

The outlet gases of said catalyst regeneration unit that evolve from said ash are purified by common methods, in order to remove their NOx and SOx content. To do this, ozone is injected to said gas stream exactly at the entrance of the gas to the SOx and NOx purification system. The gases are next mixed with a 25% ammonia solution in a mixer vessel. As a consequence of the reaction between sulfur and nitrogen oxides respectively with ozone and ammonia, NOx are reduced to $N_2$ molecules and SOx are converted to ammonium sulfate.

During the processing of vacuum residue by the proposed method, the following materials can be found: 5-7% by mass of $C_1$-$C_4$ hydrocarbon gasses, hydrogen sulfide, 14-22% by mass of $C_5$ gasoline fraction with boiling points up to 180° C. and an iodine number of 6-8, an amount of 35-42% by mass of gas oil fractions of 180-350° C. and a bromine number of 10-14, 28-36% by mass of vacuum gas oil fraction of 350-520° C. the metal content of which is less than 3 ppm and 0.3-1% of ammonium sulfate. The extent of desulfurization is 40-80%.

Said claimed process can be used for example in oil refinery industries for the production of gas, gasoline fractions, vacuum gas oil, concentrated ash containing metals and chemical fertilizers.

In summary a preferred embodiment of the process according to the present invention is hydroconverting a heavy hydrocarbonaceous feedstock by a catalyst to produce lower boiling hydrocarbon products, wherein the process comprises:

(a)—Activation of the feedstock by adding modifiers and stabilizers, (b)—Preparation of a catalyst complex containing an emulsion of pre-activated heavy hydrocarbons, water and catalytic compounds, (c)—Hydrogenation of the remaining activated heavy hydrocarbons in the presence of hydrogen gas and the emulsion of catalytic complex of step (b), (d) Fractionation of the products of step (c) as liquid-gas streams by means of atmospheric and vacuum distillation, returning of the residues of the distillation process to the process of step (a) after separating the solid particle content, (e) Separation of catalyst elements from the solid particles, wherein said catalyst elements are recycled to a preliminary catalyst complex preparation unit.

The gases evolving from the catalyst regeneration step can be purified, wherein NOx gases are reduced to molecular nitrogen as a result of ozone injection and SOx gases are converted to ammonium sulfate chemical fertilizer by injecting ammonia. The majority of the lower boiling hydrocarbon products comprise hydrocarbons of lower than 520° C. boiling points.

The products of step (c) can be fractionized as liquid-gas streams by means of atmospheric and vacuum distillation towers.

The catalyst elements are separated from the solid particles by an oxidation method.

A physico-chemical effect is used to increase the dispersion extent, in order to activate heavy hydrocarbons.

The dispersed phase species are degraded and converted to high molecule number groups and more activating hydrocarbons, which form the dispersed phase, are simultaneously added, and also stabilizers with additional surface energies are added.

The modifier contains oil fraction of at least 60% by mass of heat stable multi nuclear cyclic hydrocarbons.

The heat stable multinuclear cyclic hydrocarbons are chosen from cracking gas oils, pyrolysis resins or oil refinery extracts by selective methods.

The amount of the modifier is 0.5 to 3.5 percent by mass of the initial feedstock, depending on the type of heavy hydrocarbon.

Surface active detergents are used as stabilizers.

Compounds having polar bonds, such as acetone, diethyl keton, nitrobenzene in an amount of 0.001-0.01% by mass the feedstock are added.

The catalyst can be composed of water soluble, transition metal compounds.

The compounds of the catalyst can be convertible to catalytically active sulfides. The water soluble transition metal compounds are containing Mo. The water soluble transition metal compounds are containing ammonium paramolybdate.

In the preparation of the catalyst complex emulsion an aqueous solution of catalyst can be initially mixed with the oil fraction at a temperature lower than the boiling points of constituents of the catalyst complex. When ammonium paramolybdate is used, the homogenization temperature is in the range of 60-98° C. The source of said oil fraction can be a part of said activated heavy hydrocarbons, which is initially prepared in step (a). The amount of said oil fraction is 5-10% by weight of the total feedstock used.

In the preparation of said catalyst complex emulsion, the mass ratio of said activated feedstock to water to ammonium paramolybdate can be 1 to (0.005-0.05) to ($5 \times 10^{-5}$-$8 \times 10^{-3}$). Said resulting mixture is next homogenized so that a stabilized emulsion of drop diameters of 100 to 7000 nm, and more preferably of 200 to 600 nanometers is achieved and that the number of said particles in one $cm^3$ reaches $1*10^{14}$-$1*10^{16}$.

The activated heavy hydrocarbon can be mixed with an aqueous molybdenum solution to get the catalyst emulsion and as a result of contacting the prepared catalyst complex with the residues of activated heavy hydrocarbon, the catalyst complex emulsion, the molybdenum compound content of which is about (0.005 to 0.05)% by mass, is ready to start the reaction.

The hydrogenation process can be performed in a reactor in a temperature of between 420 to 500° C., under a pressure of 1.0-15.0 MPa and by the injection of hydrogen gas. The amount of the injected hydrogen gas is 500-1500 liters per liter of feedstock.

In order to thoroughly mix the said emulsion of catalyst with said activated heavy oil, one fragment of the catalytic complex emulsion can be added to the activated heavy hydrocarbon entering the heater before the reactor, together with hydrogen gas, and 2-4 fragments and more preferably 3 fragments are sprayed to the reaction mixture within the reactor, together with hydrogen gas, so that the concentration of Mo compound in the reaction zone, reaches to about (0.05-0.005) %, by mass of said feedstock.

The first fragment of said catalyst complex together with $H_2$ gas can be sprayed to said activated heavy hydrocarbons entering the heater before the reactor, while said activated heavy hydrocarbons is heated up to 340-400° C., so that a solution having a Mo compound concentration of (0.01-0.001) % is achieved. The second fragment together with $H_2$ gas can be sprayed to the reactor in a temperature of 400-500° C. and a mixture of Mo compound concentration of (0.03-0.003) % by mass is yielded and the third fragment of said catalyst complex together with $H_2$ gas is sprayed to the reactor in a temperature of 400-500° C. so that in said mixture of said heavy hydrocarbons, the Mo compound concentration reaches about (0.05-0.005) % by mass.

The separation of products of said reaction can be done by means of atmospheric pressure and vacuum distillation towers, in which the pressure varies from 10 mmHg to 7 MPa. The residue of said towers contains solid materials containing the organometalic compounds of heavy hydrocarbon, and heavy products of condensation reactions (coke and carbon particles, carbohydrates and asphaltene substances).

3-10% by mass of the gas oil which can be achieved from the top of said vacuum distillation tower can be injected to the residues of said vacuum distillation tower.

The catalyst regeneration process can be performed on about 90% by mass of said residues of said vacuum distillation tower. After the separation of said concentrated metals from it, and while the amount of undissolved compounds in heptanes can be at most 0.2% by mass, said residue can be recycled and fed to said hydroconversion unit, again.

The solid residue of the filtration of the middle emulsion layer can be mixed with the solid residue of the filtration of the distillation tower, having a boiling point of above 520° C. and the resulting combustible disperse is combusted. The catalyst elements can be reduced by the application a solvent on the ash of metal oxides and returned to preparation of the catalyst complex step. The residue of ash remains in the filter as a concentrate containing metal oxides.

As a result of injecting ozone to the exiting gases of the catalyst regeneration unit, nitrogen oxides can be reduced to molecular nitrogen and sulfur oxides are converted to ammonium sulfate fertilizer as a result of injecting ammonia.

The Mo containing catalyst complex can be promoted by the application of compounds that contain hydrating catalytic elements like nickel. Nickel can be used in ratios of 0.1-1 atom per each Mo atom used, and this ratio is preferably 0.5

The following examples should not imply any limitation to the scope of application of said claimed process, and are presented to just give more detail about the present invention. In these examples two samples (A, B) of vacuum residues are used as the heavy hydrocarbon, and gas oil of catalytic cracking is used as said modifier. The specifications of said materials are given in table 1.

EXAMPLES 1-20

Activation of Heavy Hydrocarbons:

The heavy hydrocarbon was activated by using physico-chemical processes and a simultaneous addition of high surface-tension modifiers. To do this, the heavy oil residue, was mixed with the modifiers in a mixing vessel. Then a dispersion and homogenization operation was performed by adding oil fractions that contain aromatic hydrocarbon modifiers. The dispersion and homogenization were performed by means of special equipment and by using the hydrodynamic effect of vapor-liquid streams with ultrasonic speed or by vibration-vacuum mechanisms that operate under high voltages, with high speeds and highly pulsed streams.

The dispersion of the resulting composite (suspensions, emulsions, colloidal solutions) was at most 200-500 nm. In laboratory conditions mechanical disk sprays, having a lower efficiency were more useful using such systems, said dispersion reaches to about 300 nm.

The activation trend was accompanied by the reduction of the viscosity, and stopped if the viscosity did not change. At such a moment, the additional shift effects did not change the viscosity.

The results obtained from the activation of heavy oil residue A are given in table 2.

Experiments 1-3 reveal that, if an amount of, up to 1%, by mass, of said modifier is added, said viscosity is extremely reduced, but if more modifier is added (up to 2% by mass), the viscosity changes are reduced gradually.

Adding the amount of keton in examples 4-5 leads to the reduction of viscosity and an increase in stability of the system.

Example 4 shows acceptable results in the activation of feedstock. The activation temperature has a remarkable effect on the rheologic properties of the system. Decreasing the dispersion and homogenization temperature will cause the viscosity reduce to a larger extent (example 6) while increasing the charge of said spraying system, that happens as a result of increasing the shift voltages, deteriorates the asphaltene agglomerates.

Examples 8-11 demonstrate the results of activation of feedstock, when it was mixed with recirculation filtrate residue with boiling points more than 520° C. (examples 8-10), and unfiltered residue with boiling points more than 520° C. (example 11). The filtrate of residue with boiling points of higher than 520° C. comprising about 0.16%, by mass of solid material does not reduce the rheological properties of the system. The resulting solution has a lower viscosity and higher stability, but the addition of solid materials with an amount of 1.4%, by mass, in the residue with boiling points of higher than 520° C., decreases the parameters of mixture, and to be more detailed, increases the viscosity and more importantly decreases the stability of the system.

Examples 12-20, illustrate the activation conditions of heavier feedstock of heavy oil residue B (Table 3), in which the amount of resin is approximately twice more than normal and the amounts of asphaltenes and hetero organic compounds of metals and sulfur compounds are high.

The regularity of the effect of modifiers on the rheologic properties of the mixture, is similar to examples mentioned about heavy oil residue of sample A, adding the modifiers decreases the viscosity dramatically, but the optimum amount of modifiers is three times larger here. The negative effect of the presence of solid materials in recycle residues with boiling points of higher than 520° C. on the rheologic properties of the solution is extremely obvious (examples 19-20).

EXAMPLES 21-39

Catalyst Complex Preparation:

Examples on the preparation of said catalyst complex are presented in tables 4 and 5. Said catalyst complex is a highly dispersed emulsion of an aqueous catalyst element solution in an oil product. To do this a miscible ammonium paromolybdate (APM) of a desired concentration was solved in the activated feedstock that was heated up to 80-90° C., and then the dispersion was performed so as to disintegrate, mix and homogenize to get a stable emulsion. The quality of the resulting emulsion was evaluated based on its viscosity, number of drops per volume unit and particle sizes. In examples 21-31 activated materials similar to example 4, were used.

To evaluate the effect of the disperse phase, in examples 22-24, the amount of water was increased while the amount of Mo was kept constant. In example 21, ammonium paramolybdate (APM) was dispersed in the pre-activated feedstock, without an aqueous phase. Addition of water dramatically decreases the viscosity of the emulsion and increasing the quantity of water phase decreases the viscosity. The most effective method for decreasing the viscosity is however the addition of about 20% by mass of water to emulsion in which case the number of drops in one cubic centimeter of said emulsion ranges form $6 \times 10^{14}$-$8 \times 10^{16}$ and the drops size of said emulsion reaches 50-350 nm, a majority of which, about 80% of all in the size range of 90-200 nm. Addition of more than 30%, by mass, of water does not change the viscosity at all. Examples 25 and 26 illustrate the quality of said emulsion, under the same conditions, by adding 20% of water to the heavy un-active residue. The quality of the emulsion in example 23 is much lower, in comparison to that of example 23. The emulsion viscosity is higher, the number of drops in one cubic centimeter is lower, and the drop sizes are larger.

The quality of the emulsion in example 26, which was prepared with the heavy inactive oil residues, has improved to some extent. The extent of dispersion and homogenization time has approximately doubled, in comparison to example 25.

In examples 27-29, in addition to maintaining the amount of the liquid phase at a constant level, the amount of the catalytic additive (APM) was changed from 0.05% to 2%. The optimum condition is to prepare an emulsion with an oil product to water to APM ratio of 1 over 0.012-0.25 over $3.4 \times 10^{-14}$-$6.8 \times 10^{-3}$. Under these conditions, in the feedstock, 90% of the emulsion drops have sizes of 0.5-6 μm with a density of $10^{15}$-$10^{16}$ drops/Cm$^3$, which leads to a relatively more ever distribution of catalyst components in the activated feedstock and increases the hydrogenation quality.

Examples 32-39, show the results of catalyst complex preparation using the residues of the activated heavy oil sample B according to example 13. In examples 32-36, the amount of used water was increased from 0-30%, the amount of APM being constant. The emulsion viscosity decreases as a result of adding water. The maximum viscosity drop is observed for water amounts of 10-20% (by mass). With further addition of water, the viscosity drop curve, as in the case of heavy oil residue A, shows a mild slope. In example 36, in the preparation of the catalyst complex with the un-active heavy oil residue, the emulsion viscosity is high and the number of emulsion drops per 1 cubic centimeter, is 1000 times less, in comparison to cases of application of the activated heavy oil residue. Increasing the concentration of APM solution increases the concentration of emulsion particles, a bit. Efforts made to achieve a highly dispersed emulsion, do not give rise to acceptable results in temperatures below 90° C. A high quality catalyst complex emulsion, is however, achieved in 90° C.

EXAMPLES 42-63

Hydroconversion Experiments:

Hydroconversion experiments were performed in a reactor with a 2 kg/h capacity. Said reactor was a vertical cylindrical type with a volume of 1000 Cm$^3$, equipped with a three-part compensation electrical heater. Hydrogen and catalyst injections were performed in a segment before the heater, in the reactor entrance, and after the said first and second parts of said heating sections.

In examples 42-44, a sample of heavy oil residue A, activated according to example 4, was hydrogenised by adding 10%, by mass, of said catalyst complex, that was prepared according to examples 22-24, and the amount of water which ranged from 10-30%, by mass.

The amount of water being 3%, by mass, of the feedstock in example 44, the hydroconversion indexes will not be good, the amount of conversion and desulfurization decrease. In example 42, the values for hydrogenization parameters, were defined with the product out let and desulfurization, as criteria, is not good either. Decreasing the amount of Mo in example 45 down to an amount of one tenth, leads to a poor hydrogenization, which are at level of example 46, in which hydrogenization was performed on the sample, without feed activation and with a high Mo density. Comparing example 46 with the results of examples 42-45, that were performed with the activated feedstock and the catalyst complex, and the results of examples 47-49, in which the feedstock entered in some segments, reveals that, according to the present invention, the values of the indexes of this process, the feedstock conversion, decrease of the outlet of the plugging products (that plug the catalyst pores) and the increase in the desulfurization have substantially grown.

The results of example 43, wherein the amount of water is 2%, by mass, of the feedstock, are better. Examples 47-49 show that the introduction of said catalyst complex affects the indexes of the hydrogenation of the heavy oil residues.

The best results are obtained in examples 48-49, wherein said catalyst complex was injected in 3 and 4 parts.

This method increases the outlet of distillation fractions and the amount of desulfurization dramatically and the plugging outlet products (the solid residues which boiling points of higher than 520° C.) are reduced. Examples 50-52 reveal the effect of temperature on the hydrogenization. Decreasing the temperature down to 440° C. decreases the conversion, and the desulfurization is also decreased, however the total amount of desulfurization is still high. Increasing the temperature over 450° C. promotes coke formation. Existence of more than 2% of solid materials in the residue, that have boiling points of over 520° C. is on evidence. Having the mentioned volume rate, the ideal temperature is 440-450° C.

Examples 53-63 show the results for the hydrogenation of the heavy residues obtained from heavy oil B. Examples 54-56 show that increasing the pressure from 4 to 9.5 MPa, while other effective parameters were held at their optimum values, leads to a higher yield of distillation. The desulfurization increases and the gas evolution reaction intensify.

Examples 55 and 57-59 reveal the effects of increasing of the recycling stream and also increasing the Mo over feedstock ratio, on the indexes of this process and also the relationship between the indexes with the amount of the fresh injected APM or the amount of catalyst present in the recycling stream as molybdenum sulfide.

Comparing examples 55 with 57 and 58 with 59 show that it is better to inject Mo to the reaction zone, as APM. These regularities are highlighted in experiments using more concentrated APM, in examples 60-63, and by using fresh and regenerated APM solutions.

Recycling the vacuum distillation residue, containing plenty of solid materials deteriorates the process indexes. Examples 55-63 show the hydrogenization results with respect to the amount of solid material in the recycling stream in the residues with boiling points of over 520° C. The optimum amount of said solid materials in said residue is at most 0.2%.

The preferred embodiments described above are only to clarify the present invention but not to limit the scope of the present invention. Any modification and variation made by the persons skilled in the art according to the spirit of the present invention is to be included within the scope of the present invention.

TABLE 1

| Index | | Sample A | Sample B | Catalytic cracking gas oil |
|---|---|---|---|---|
| Density at 20° C. | $Kg/m^3$ | 997.3 | 1088.0 | 993.8 |
| Molecular weight | | 790 | 1222 | 230 |
| Sulfur content | | 2.4 | 5.8 | 1.87 |
| Conradson Coking | | 17.3 | 21.0 | 1.5 |

TABLE 1-continued

| Index | Sample A | Sample B | Catalytic cracking gas oil |
|---|---|---|---|
| Solidification temp | +31 | +51 | +16 |
| Content of up to 500° C. fractions | 4.0 | 4.0 | 88.0 |
| Kinematics Viscosity at 80° C. | 3431 | 22480 | 4.4 |
| Hydrocarbon composition | | | |
| Paraffin-oil | 10.2 | 8.6 | 29.8 |
| Aromatics | 53.5 | 35.6 | 69.3 |
| Resins | 23.4 | 36.3 | 0.9 |
| Asphaltene | 8.1 | 19.5 | — |
| Metal Content | | | |
| Vanadium | 136 | 522 | — |
| Nickle | 34 | 83 | — |

TABLE 2

Activation of sample A

| | | | Number and conditions of the examples | | | | | |
|---|---|---|---|---|---|---|---|---|
| | | | T = 80° C. | | | | | T = 60° C. |
| No | Feedstock components | | 1 | 2 | 3 | 4 | 5 | 6 |
| 1 | Sample A: % wt. | | 99.5 | 990 | 98.0 | 99.0 | 99.0 | 99.0 |
| 2 | Modifiers: % wt | Cat. Cracking light gas oil | 0.5 | 1.0 | 2.0 | 1.0 | 1.0 | 1.0 |
| | | keton | 0.001 | 0.001 | 0.001 | 0.005 | 0.01 | 0.005 |
| 3 | Recycle, % wt | >520° C. filterate residue | — | — | — | — | — | — |
| | | >520° C. residue Solid content in the recycle | — | — | — | — | — | — |
| | | | Activated feed specifications | | | | | |
| 4 | Kinetic viscosity at 80° C., cSt | | 2620 | 1910 | 1760 | 1890 | 1880 | 1800 |
| 5 | Stability level | | 1.3 | 1.7 | 1.8 | 1.9 | 2.1 | 1.7 |

| | | | Number and conditions of the examples | | | | |
|---|---|---|---|---|---|---|---|
| | | | T = 90° C. | T = 80° C. | | | |
| No | Feedstock components | | 7 | 8 | 9 | 10 | 11 |
| 1 | Sample A: % wt. | | 99.0 | 94.0 | 89.0 | 84.0 | 90.2 |
| 2 | Modifiers: % wt | Cat. Cracking light gas oil | 1.0 | 1.0 | 1.0 | 1.0 | 0.8 |
| | | keton | 0.005 | 0.005 | 0.005 | 0.005 | 0.005 |
| 3 | Recycle, % wt | >520° C. filterate | — | 5.0 | 10.0 | 15.0 | — |

TABLE 2-continued

Activation of sample A

|   |   |   |   |   |   |   |
|---|---|---|---|---|---|---|
|   | residue |   |   |   |   |   |
|   | >520° C. residue | — | — | — | — | 5.0 |
|   | Solid content in the recycle | — | 0.16 | 0.16 | 0.16 | 1.4 |

Activated feed specifications

|   |   |   |   |   |   |   |
|---|---|---|---|---|---|---|
| 4 | Kinetic viscosity at 80° C., cSt | 1940 | 1420 | 1305 | 1284 | 1490 |
| 5 | Stability level | 1.8 | 1.9 | 2.0 | 1.9 | 1.3 |

TABLE 3

Activation of sample B

Conditions and Number of examples

| | | T = 90° C. | | | T = 80° C. | T = 98° C. | | T = 90° C. | |
|---|---|---|---|---|---|---|---|---|---|
| No | Feedstock components | 12 | 13 | 14 | 15 | 16 | 17 | 18 | 19 | 20 |
| 1 | Sample B: % wt. | 98.0 | 97.0 | 96.0 | 98.0 | 98.0 | 98.0 | 98.0 | 97.0 | 97.0 |
| 2 | Modifiers, % wt  cat. Cracking light gas oil | 2.0 | 3.0 | 4.0 | 2.0 | 2.0 | 2.0 | 3.0 | 3.0 | 3.0 |
|   | Keton | 0.005 | 0.005 | 0.005 | 0.01 | 0.005 | 0.005 | 0.005 | 0.005 | 0.005 |
| 3 | Recycle, % wt  Filtrate | — | — | — | — | — | — | — | 5.0 | — |
|   | residue > 520° C. | — | — | — | — | — | — | — | — | — |
|   | residue > 520° C. | — | — | — | — | — | — | — | — | 5.0 |
|   | Solid contents in recycle | — | — | — | — | — | — | — | 0.18 | 2.4 |

Activated feed specifications

| | | | | | | | | | | |
|---|---|---|---|---|---|---|---|---|---|---|
| 4 | Kinetic viscosity at 80° C., St | 16240 | 11920 | 10860 | 17980 | 12570 | 14670 | 9860 | 8940 | 13745 |
| 5 | Stability level | 1.3 | 1.9 | 2.0 | 1.9 | 2.1 | 1.8 | 2.2 | 1.9 | 1.2 |

TABLE 4

Preparation of catalytic complex with activated sample A.

| | Feedstock | Number of examples, Preparation conditions: T = 90° C., P = 1 atm. | | | | | | | | | | |
|---|---|---|---|---|---|---|---|---|---|---|---|---|
| No | components | 21 | 22 | 23 | 24 | 25 | 26** | 27 | 28 | 29 | 30 | 31 |
| 1 | Sample of A, % wt | — | — | — | — | 80 | 80 | — | — | — | — | — |
| 2 | Activated sample of A, % wt | 99.5 | 90 | 80 | 70 | — | — | 80 | 80 | 80 | 80 | 80 |
| 3 | Catalytic additive, aqueous solution of APM, % wt | 0.5 | 10 | 20 | 30 | 20 | 20 | 20 | 20 | 20 | 20 | 20 |
|   | Including APM, % wt | 0.5 | 0.5 | 0.5 | 0.5 | 0.5 | 0.5 | 2.0 | 1.0 | 0.05 | 0.15 | 0.5 |
| 4 | Mo content in catalytic complex, % wt | 0.2738 | 0.2738 | 0.2738 | 0.2738 | 0.2738 | 0.2738 | 1.0866 | 0.5476 | 0.0274 | 0.0815 | 0.2738 |
| 5 | Catalyst modifiers, % wt  Mo | — | — | — | — | — | — | — | — | — | 0.0815* | — |
|   | Ni | — | — | — | — | — | — | — | — | — | 0.1620* | 0.1358 |
|   | Co | — | — | — | — | — | — | — | — | — | 0.1290* | 0.0714 |

Catalytic complex emulsion specifications

| | | | | | | | | | | | | |
|---|---|---|---|---|---|---|---|---|---|---|---|---|
| 6 | Kinetic viscosity at 80° C., cSt | 1880 | 1260 | 940 | 820 | 1310 | 1120 | 830 | 824 | 816 | 920 | 824 |
| 7 | Number of drops in 1 cm$^3$ | — | $1*10^{15}$ | $1*10^{16}$ | $1*10^{14}$ | $1*10^{12}$ | $1*10^{13}$ | $8*10^{14}$ | $1*10^{15}$ | $6*10^{15}$ | $1*10^{15}$ | $5*10^{15}$ |

TABLE 4-continued

Preparation of catalytic complex with activated sample A.

Number of examples, Preparation conditions: T = 90° C., P = 1 atm.

| No | Feedstock components | 21 | 22 | 23 | 24 | 25 | 26** | 27 | 28 | 29 | 30 | 31 |
|---|---|---|---|---|---|---|---|---|---|---|---|---|
| 8 | Diameter of drops, $10^3$ nm | — | 0.1-5 | 0.5-6 | 5-40 | 80 | 60 | 1-4 | 0.8-5 | 0.1-4 | 0.8-3 | 0.8-5 |

**Dispersion and homogenization time is increased up to 2 times.
*Catalytic components with recycle

TABLE 5

Preparation of catalytic complex with activated sample B

Numbers of examples and Preparation Conditions: T = 95° C., P = 1 atm.

| No | Feedstock components | 32 | 33 | 34 | 35 | 36 | 37 | 38 | 39 |
|---|---|---|---|---|---|---|---|---|---|
| 1 | Sample B, % wt | — | — | — | — | 80 | — | — | — |
| 2 | Activated sample B, % wt | 99.5 | 90 | 80 | 70 | — | 80 | 80 | 80 |
| 3 | Water with APM solution, % wt | — | 10 | 20 | 30 | 20 | 20 | 20 | 20 |
| 4 | APM, % wt | 0.5 | 0.5 | 0.5 | 0.5 | 0.5 | 2.0 | 1.0 | 0.05 |
| 5 | Catalyst modifiers, % wt | 0.2716 | 0.2716 | 0.2716 | 0.2716 | 0.2716 | 1.0866 | 0.5477 | 0.0272 |
| | Catalytic complex emulsion specifications | | | | | | | | |
| 6 | Kinetic viscosity at 80° C., cSt | 11790 | 6260 | 4405 | 4020 | 18670 | 4570 | 4490 | 4446 |
| 7 | Number of drops in 1 cm³ | — | $4*10^{12}$ | $9*10^{14}$ | $6*10^{15}$ | $6*10^{11}$ | $9*10^{15}$ | $2*10^{14}$ | $9*10^{14}$ |
| 8 | Diameter of drops, $10^3$ nm | — | 2-14 | 0.5-6 | 0.8-8 | 5-78 | 0.5-7 | 4-20 | 6-34 |

TABLE 6

Hydrogenation of the sample A

Number and Conditions of examples

| NO | Feed stock components | | 40 | 41 | 42 | 43 | 44 (пр) | 45 | 46 | 47 | 48 | 49 | 50 |
|---|---|---|---|---|---|---|---|---|---|---|---|---|---|
| 1 | Sample A, % wt | | — | — | — | — | 100.0 | — | — | — | — | — | — |
| 2 | Activated sample A, % wt | | 90 | 90 | 90 | 90 | — | 90 | 90 | 90 | 90 | 90 | 90 |
| 3 | Activated sample A with catalytic complex, % wt | | 9.0 | 8.0 | 7.0 | 8 | — | 8.0 | 8.0 | 8.0 | 8.0 | 8.0 | 8.0 |
| 4 | Water with catalyst, % wt. | | 1.0 | 2.0 | 3.0 | 2.0 | 2.0 | 2.0 | 2.0 | 2.0 | 2.0 | 2.0 | 2.0 |
| 5 | Consumption of Mo in catalyst complex, % by weight of heavy hydrocarbon | 1 portion | 0.02716 | 0.02716 | 0.02716 | 0.00276 | 0.02716 | 0.0163 | 0.0108 | 0.0108 | 0.0108 | 0.0108 | 0.0108 |
| | | 2 portion | — | — | — | — | — | 0.0108 | 0.0082 | 0.0055 | 0.0055 | 0.0055 | 0.0055 |
| | | 3 portion | — | — | — | — | — | — | 0.0082 | 0.0054 | 0.0054 | 0.0054 | 0.0054 |
| | | 4 portion | — | — | — | — | — | — | — | 0.0054 | 0.0054 | 0.0054 | 0.0054 |
| 6 | Total consumption of Mo in feedstock % wt | | 0.02716 | 0.02716 | 0.02716 | 0.00276 | 0.02716 | 0.02716 | 0.02716 | 0.02716 | 0.02716 | 0.02716 | 0.02716 |
| | Hydrogen % wt | 1 portion | 2.0 | 2.0 | 2.0 | 2.0 | 2.0 | 1.5 | 1.0 | 0.8 | 0.8 | 0.8 | 0.8 |
| | | 2 portion | — | — | — | — | — | 0.5 | 0.5 | 0.4 | 0.4 | 0.4 | 0.4 |
| | | 3 portion | — | — | — | — | — | — | 0.5 | 0.4 | 0.4 | 0.4 | 0.4 |
| | | 4 portion | — | — | — | — | — | — | — | 0.4 | 0.4 | 0.4 | 0.4 |
| 7 | Temperature in reaction zone, ° C. | | 450 | 450 | 450 | 450 | 450 | 450 | 450 | 470 | 450 | 440 | 430 |
| 8 | Pressure in reaction zone, MPa | | 7.0 | 7.0 | 7.0 | 7.0 | 7.0 | 7.0 | 7.0 | 7.0 | 7.0 | 7.0 | 7.0 |
| 9 | Flow rate, $h^{-1}$ | | 2.0 | 2.0 | 2.0 | 2.0 | 2.0 | 2.0 | 2.0 | 2.0 | 2.0 | 2.0 | 2.0 |
| | Output and characteristics of reaction products | | | | | | | | | | | | |
| | Output of reaction products, % wt | $c_1$-$c_4$ H$_2$S | 6.3 | 5.8 | 5.5 | 4.7 | 4.8 | 6.1 | 6.0 | 5.9 | 6.7 | 5.4 | 4.8 |
| | | Fr. $C_5$ –520° C. | 84.7 | 87.3 | 86.0 | 80.9 | 83.6 | 89.0 | 90.2 | 91.2 | 91.5 | 89.0 | 80.9 |
| | | Fr. >520° C. | 8.0 | 6.9 | 8.5 | 14.4 | 12.6 | 4.9 | 3.8 | 2.9 | 1.8 | 5.6 | 14.3 |
| | Solid contents in >520° C. | | 2.1 | 1.8 | 1.6 | 1.9 | 2.6 | 1.7 | 1.3 | 1.1 | 2.1 | 0.8 | 0.9 |
| | Desulphurization level | | 48 | 58 | 50 | 42 | 42 | 62 | 72 | 79 | | 71 | 67 |

TABLE 7

Hydrogenation of the sample B

| Feed stock | | Number and conditions of experiments | | | | | |
|---|---|---|---|---|---|---|---|
| No | components | 51 | 52 | 53 | 54 | 55 | 56 |
| 1 | Activated sample B % wt | 90 | 85.0 | 85.0 | 85.0 | 85.0 | 80.0 |
| 2 | Recycle, % wt | — | 5.0 | 5.0 | 5.0 | 10.0 | 10.0 |
| 3 | Solid content in recycle % wt | — | 0.18 | 0.18 | 0.18 | 2.4 | 2.4 |
| 4 | Activated feedstock with catalytic complex, % wt | 7.0 | 7.0 | 7.0 | 7.0 | 7.0 | 7.0 |
| 5 | Water with catalyst, % wt | 3.0 | 3.0 | 3.0 | 3.0 | 3.0 | 3.0 |
| 6 | Mo content in catalytic complex, % wt. on feed stock | 0.02738 | 0.02138 | 0.02138 | 0.02138 | 0.00679 | 0.00679 |
| 7 | Regenerated Mo, % wt: on feed stock | — | — | — | — | — | — |
| 8 | Mo. Content in recycle, % wt on feed stock | — | 0.006 | 0.006 | 0.006 | 0.02059 | 0.04074 |
| 9 | Total consumption on feed stock, % wt | 0.2738 | 0.02738 | 0.02738 | 0.02738 | 0.02738 | 0.04750 |
| 10 | Water consumption, % wt | 2.0 | 2.0 | 2.0 | 2.0 | 2.0 | 2.0 |
| 11 | Temp. in reaction, ° C. | 446 | 445 | 445 | 445 | 445 | 445 |
| 12 | Pressure in reaction zone, MPa | 7.0 | 9.5 | 7.0 | 4.0 | 7.0 | 7.0 |
| 13 | Flow rate, h$^{-1}$ | 2.0 | 2.0 | 2.0 | 2.0 | 2.0 | 2.0 |
| | Indexes of the process | | | | | | |
| Reaction out put products, % wt. | $c_1$-$c_4$ $H_2S$ | 6.0 | 7.1 | 6.2 | 4.3 | 4.2 | 6.8 |
| | Fr. $C_5$ –520° C. | 87.2 | 87.7 | 86.8 | 81.2 | 83.1 | 83.1 |
| | Fr. >520° C. | 6.8 | 5.2 | 7.0 | 14.5 | 12.7 | 10.1 |
| Solid content in >520° C. Fr., % wt | | 1.6 | 1.4 | 1.7 | 1.9 | 3.6 | 3.8 |
| Desulphurization level | | 78 | 79.6 | 80.1 | 67.4 | 58.1 | 61.2 |

| Feed stock | | Number and conditions of experiments | | | | |
|---|---|---|---|---|---|---|
| No | components | 57 | 58 | 59 | 60 | 61 |
| 1 | Activated sample B % wt | 010 | 90 | 90 | 85 | 85 |
| 2 | Recycle, % wt | 85 | — | — | 5.0 | 5.0 |
| 3 | Solid content in recycle % wt | 0.18 | — | — | 0.18 | 2.4 |
| 4 | Activated feedstock with catalytic complex, % wt | 7 | 8.0 | 8.0 | 8.0 | 8.0 |
| 5 | Water with catalyst, % wt | 3 | 2.0 | 2.0 | 2.0 | 2.0 |
| 6 | Mo content in catalytic complex, % wt. on feed stock | 0.04738 | 0.0213 | 0.02138 | 0.00522 | 0.00522 |
| 7 | Regenerated Mo, % wt: on feed stock | — | — | 0.02197 | 0.01616 | — |
| 8 | Mo. Content in recycle, % wt on feed stock | 0.0012 | — | — | 0.006 | 0.02216 |
| 9 | Total consumption on feed stock, % wt | 0.04750 | 0.04750 | 0.02738 | 0.02734 | 0.02738 |
| 10 | Water consumption, % wt | 2 | 2.0 | 2.0 | 2.0 | 2.0 |
| 11 | Temp. in reaction, ° C. | 445 | 440 | 440 | 440 | 440 |
| 12 | Pressure in reaction zone, MPa | 7 | 7.0 | 7.0 | 7.0 | 7.0 |
| 13 | Flow rate, h$^{-1}$ | 2 | 2.0 | 2.0 | 2.0 | 2.0 |
| | Indexes of the process | | | | | |
| Reaction out put products, % wt. | $c_1$-$c_4$ $H_2S$ | 6.3 | 6.7 | 6.6 | 5.7 | 4.3 |
| | Fr. $C_5$ –520° C. | 90.8 | 85.4 | 85.1 | 86.1 | 77.3 |
| | Fr. >520° C. | 2.9 | 7.9 | 8.3 | 5.3 | 18.4 |
| Solid content in >520° C. Fr., % wt | | 1.5 | 1.2 | 1.3 | 1.6 | 3.2 |
| Desulphurization level | | 81.3 | 73 | 76 | 49 | 38 |

The invention claimed is:

1. A process for hydroconverting a heavy hydrocarbonaceous feedstock comprising a catalyst to produce lower boiling hydrocarbon products, which process comprises the following steps:
   (a) Activation of the feedstock by adding modifiers and stabilizers;
   (b) Preparation of a catalyst complex comprising an emulsion of the pre-activated heavy hydrocarbons of step a), water and catalytic compounds;
   (c) Hydrogenation of the remaining activated heavy hydrocarbons in the presence of hydrogen gas and the emulsion of catalytic complex of step (b);
   (d) Fractionation of the products of step (c) as liquid-gas streams by means of atmospheric and/or vacuum distillation;
   (e) Returning the residues of the distillation process to the process of step (a) after separating the solid particle content;
   (f) Separation of catalyst elements from the solid particles, wherein said catalyst elements are recycled to a preliminary catalyst complex preparation unit.

2. The process according to claim 1, wherein the gases evolving from the catalyst regeneration step are purified by reducing NOx gases to molecular nitrogen as a result of ozone injection and converting SOx gases to ammonium sulfate chemical fertilizer by injecting ammonia.

3. The process according to claim 1, wherein the majority of the lower boiling hydrocarbon products comprise hydrocarbons with a boiling point of lower than 520° C.

4. The process according to claim 1, wherein the products of step (c) are fractionized as liquid-gas streams by means of atmospheric and vacuum distillation towers.

5. The process according to claim 1, wherein the remaining solid particles in the recycled residues of distillation process are about 0.2% by weight.

6. The process according to claim 1, wherein the catalyst elements are separated from the solid particles by oxidation and ammoniacarbonate methods.

7. The process according to claim 1, wherein a physicochemical effect is used to increase the dispersion extent for activating heavy hydrocarbons.

8. The process according to claim 1, wherein the dispersed phase species are degraded and converted to groups each of which contains a number of molecules and activating hydrocarbons, which form the dispersed phase, and stabilizers are added.

9. The process according to claim 1, wherein the modifier comprises an oil fraction of at least 60% by mass of heat stable cyclic hydrocarbons.

10. The process according to claim 9, wherein the heat stable cyclic hydrocarbons are selected from cracking gas oils, pyrolysis resins or oil refinery extracts.

11. The process according to claim 9, wherein the amount of the modifier is 0.5 to 3.5 percent by mass of the initial feedstock.

12. The process according to claim 1, wherein surface active detergents are used as stabilizers.

13. The process according to claim 1, wherein a compound selected from acetone, diethyl ketone and/or nitrobenzene is used as stabilizer in an amount of 0.001-0.01 percent of the feedstock are added.

14. The process according to claim 1, wherein the catalyst comprises compounds which are water soluble and include transition metals.

15. The process according to claim 14, wherein the compounds of the catalyst are convertible to catalytically active sulfides.

16. The process according to claims 14, wherein the transition metal is Mo.

17. The process according to claim 14, wherein compound which is water soluble and includes a transition metal comprises ammonium paramolybdate.

18. The process according to claime 14, wherein the transition metals is Mo or Ni.

19. The process according to claim 1, wherein for the preparation of catalyst complex emulsion an aqueous solution of catalyst is initially mixed with the activated oil fraction of step a) at a homogenization temperature lower than the boiling points of constituents of the catalyst complex.

20. The process according to claim 19 wherein the homogenizeation temperature is in the range of 60-98° C.

21. The process according to claim 1, wherein, in order to improve the process, one fragment of the catalytic complex emulsion is added to the activated heavy hydrocarbon entering the heater before the reactor, together with hydrogen containing gas, and 2-4 fragments are sprayed to the reaction mixture within the reactor, together with hydrogen gas.

22. The process according to claim 21, wherein 3 fragments are sprayed.

23. The process according to claim 1, wherein the catalyst elements are separated from solid particles remaining from the filtration of the mid-emulsion of the atmospheric distillation and residue of vacuum distillation are recycled to the preliminary catalyst complex preparation unit.

24. The process according to claim 19, wherein in the preparation of said catalyst complex emulsion the mass ratio of said activated feedstock to water to ammonium paramolybdate can be 1 to (0.005-0.05) to ($5 \times 10^{-5}$-$8 \times 10^{-3}$).

25. The process according to claim 19, wherein in the preparation of said catalyst complex emulsion the drop diameters of stabilized emulsion are 100 to 7000 nm.

26. The process according to claim 14, wherein the Mo compound concentration in the reaction zone is 0.005 to 0.05% by mass.

27. The process according to claim 25, wherein in the preparation of said catalyst complex emulsion the drop diameters of stabilized emulsion are 200 to 600 nm.

* * * * *

UNITED STATES PATENT AND TRADEMARK OFFICE
CERTIFICATE OF CORRECTION

| | |
|---|---|
| PATENT NO. | : 7,585,406 B2 |
| APPLICATION NO. | : 11/505769 |
| DATED | : September 8, 2009 |
| INVENTOR(S) | : Khadzhiev et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this

Fourteenth Day of September, 2010

David J. Kappos
*Director of the United States Patent and Trademark Office*